May 7, 1974  G. LENZ ET AL  3,809,679
HIGH MOLECULAR WEIGHT LINEAR AROMATIC POLYESTERAMINDES
Original Filed April 9, 1970
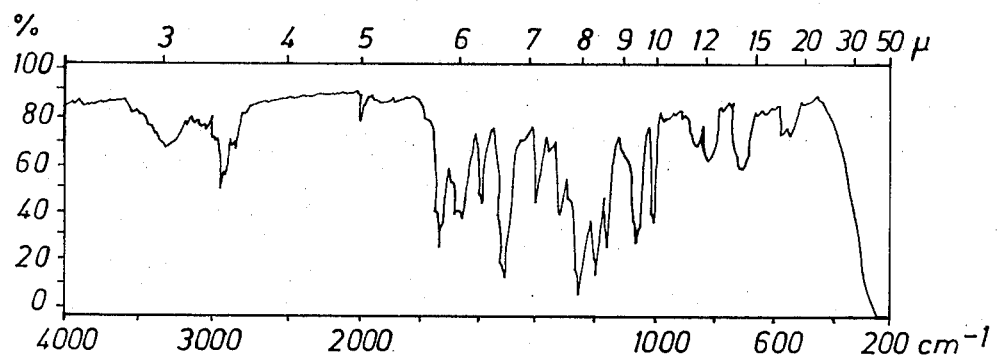
INVENTORS:
GÜNTHER LENZ, HEINRICH KRIMM, HERMANN SCHNELL.
BY
Plumley & Tyner

United States Patent Office 3,809,679
Patented May 7, 1974

3,809,679
HIGH MOLECULAR WEIGHT LINEAR AROMATIC POLYESTERAMIDES
Günther Lenz and Heinrich Krimm, Krefeld-Bockum, and Hermann Schnell, Krefeld-Urdingen, Germany, assignors to Bayer Aktiengesellschaft, Leverkusen, Germany
Continuation of abandoned application Ser. No. 27,093, Apr. 9, 1970. This application Feb. 22, 1972, Ser. No. 228,413
Int. Cl. C08g 20/20
U.S. Cl. 260—47 CZ   8 Claims

ABSTRACT OF THE DISCLOSURE

Novel high molecular weight polyesteramides with outstanding thermal stability and mechanical strengths are obtained by polycondensing an aromatic dicarboxylic acid dihalide simultaneously with from 90 to 10 mol percent of an aromatic or araliphatic dihydroxy compound and from 10 to 90 mol percent of an aromatic or araliphatic diamino compound. The polycondensation products can contain chlorine or bromine and ether, sulphide or sulphone groups. The ratio of ester and amide groups in the polycondensate can be varied in limits between about 1:9 and 9:1.

---

This is a continuation of application, Ser. No. 27,093, filed Apr. 9, 1970, abandoned.

This invention relates to high molecular weight linear aromatic polyester amides with favourable service properties, and to a process for their production.

It is known that high molecular weight linear polyester amides can be obtained by reacting dicarboxylic acids, or their derivatives, with dihydroxy compounds and diamines, or with hydroxy-amino compounds. Whilst the polyesteramides obtained from purely aliphatic or partly from aliphatic and partly from aromatic starting materials have relatively low softening temperatures, the hitherto known purely aromatic polyesteramides, for example polyesteramides obtained from bisphenols and mononuclear aromatic diamines, for example m- or p-phenylene diamine, by polycondensation with bifunctional derivatives of isophthalic acid or terephthalic acid, are insoluble and in most instances infusible as well. Consequently, aromatic polyesteramides have not yet acquired any significance as plastics.

It is an object of this invention to avoid the above mentioned disadvantages.

This object is accomplished by novel high molecular weight polyesteramides consisting of from 10 to 90 mol percent of recurring structural units of the general formula

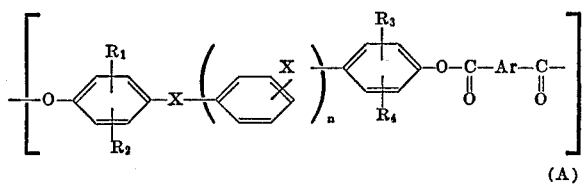

(A)

and from 90 to 10 mol percent of recurring structural units of the general formula

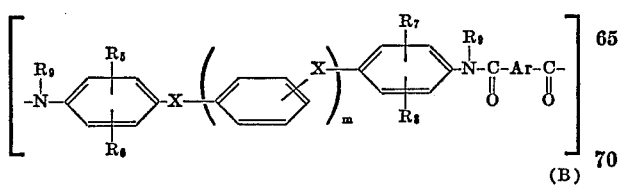

(B)

in which $R_1$ to $R_8$, which may be the same or different, each represents hydrogen, a $C_1$ to $C_3$ alkyl radical, chlorine or bromine, $R_9$ represents hydrogen, a $C_1$ to $C_4$ alkyl radical or a $C_6$ to $C_{12}$ aryl radical, Ar represents a p- or m-phenylene, a diphenylene, diphenyl-alkylene, diphenyl ether, diphenyl sulphide or diphenyl sulphone radical, X represents a direct bond or a bivalent radical selected from the group consisting of a $C_1$ to $C_5$ alkylene, a $C_1$ to $C_5$ isoalkylene, a $C_5$ to $C_{12}$ cycloalkylene, oxygen and sulphur radical, and $n$ and $m$, which may be the same or different, each represents 0 or 1, the total units of the Formulae A and B being more than 10 and preferably more than 40, and the polyesteramides having a reduced viscosity:

$$\pi^{\text{red}} = \eta_{\text{rel}} - 1/c$$

in excess of 0.3.

Depending upon their particular constitution, these novel polyesteramides are soluble in different solvents, such as methylene chloride, chlorobenzene, chloroform, tetrahydrofuran, cyclohexanone, N-methyl pyrrolidone, dimethyl formamide, hexamethyl phosphoric acid triamide and pyridine, have high softening temperatures and other valuable properties as plastics.

They can be processed from solutions in such solvents, or in some instances even from melts in injection moulding machines or screw extruders.

One particularly advantageous and characteristic property of the products obtained according to the invention is their outstanding thermal stability. At setting temperatures of up to about 295° C. and temperature resistances up to more than 400° C., it is possible to produce shaped articles such as films, foils or fibres, and in some instances even injection mouldings, which can be used at temperatures in a range extending far beyond 200° C.

The products also show outstanding mechanical strength, such as tensile strength, impact strength and flexural strength, coupled with a high modulus of elasticity. At the same time, they show high breaking elongation values. Accordingly, they are plastics with particularly valuable properties. They can be orientated by stretching and as a result are also suitable for the production of fibres and films that are resistant to high temperatures. Films and coatings resistant to high temperatures can be obtained from solutions.

It is another object of this invention to provide a process for the production of the above described high molecular weight polyamides by polycondensation of an aromatic dicarboxylic acid dihalide corresponding to the general formula Hal—CO—Ar—CO—Hal wherein Hal represents halogen, and Ar represents a p- or m-phenylene, a diphenylene, diphenylalkylene, diphenyl ether, diphenyl sulphide or diphenyl sulphone radical, simultaneously with from 90 to 10 mol percent of a dihydroxy compound corresponding to the general formula:

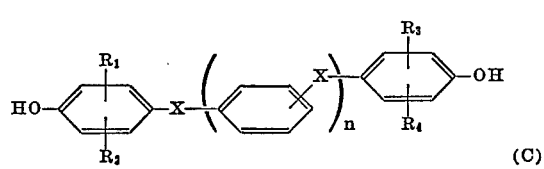

(C)

and from 10 to 90 mol percent of a diamino compound of the general formula:

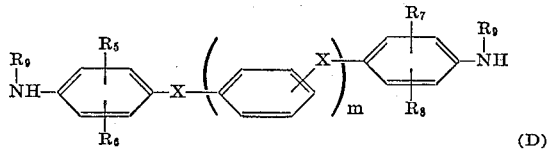

(D)

in which

R₁ to R₈, which may be the same or different, each represents hydrogen, a C₁ to C₃ alkyl radical, chlorine or bromine, R₉ represents hydrogen, a C₁ to C₄ alkyl radical or a C₆ to C₁₂ aryl radical, X represents a direct bond or a bivalent radical selected from the group consisting of a C₁ to C₅ alkylene, a C₁ to C₅ isoalkylene, a C₅ to C₁₂ cycloalkylene, oxygen and sulphur radical, and n and m, which may be the same or different, each represents 0 or 1, at a temperature of from −20 to +60° C., optionally in the presence of a catalyst.

Although it is preferred to use such aromatic dicarboxylic acid dihalides as those of terephthalic and isophthalic acid, it is also possible to use those of other dicarboxylic acids including, for example, naphthalene dicarboxylic acid, diphenyl dicarboxylic acid, diphenyl ether dicarboxylic acid and 2,2-diphenyl propane-4,4'-dicarboxylic acid. The dichlorides are preferably used.

The following are examples of suitable dihydroxy compounds corresponding to the above General Formula C: 4,4'-dihydroxy-diphenyl; 4,4'-dihydroxy-diphenyl ether; 4,4'-dihydroxy-diphenyl sulphide; 4,4'-dihydroxy-diphenyl sulphone; and preferably bis-(4-hydroxyphenyl)-alkanes such as 4,4'-dihydroxy-diphenyl methane, 2,2-(4,4'-dihydroxy-diphenyl)-propane, 2,2-(4,4'-dihydroxy-diphenyl)-butane, and 3,3-(4,4'-dihydroxy-diphenyl)-pentane. Polynuclear aromatic dihydroxy compounds, such as α,α'-(4,4'-dihydroxy-diphenyl)-p-diisopropyl benzene and α,α'-(4,4'-dihydroxy-diphenyl)-m-diisopropyl benzene can also be employed.

The following are examples of suitable diamino compounds of the above General Formula D: binuclear aromatic diamines, for example 4,4'-diamino-diphenyl,
4,4'-di-(N-methylamino)-diphenyl,
4,4'-diamino-diphenyl ether,
4,4'-diamino-diphenyl sulphone,
4,4'-diamino-diphenyl sulphide,
4,4'-di-(N-ethylamino)-diphenyl ether,
4,4'-diamino-diphenyl methane,
2,2-(4,4'-diamino-diphenyl)-propane,
2,2-(4,4'-di-N-methylamino-diphenyl)-propane,
4,4'-di-N-ethylamino-diphenyl methane, and
2,2-(4,4'-di-N-phenylamino-diphenyl)-propane;

and polynuclear diamines such as

α,α'-(4,4'-diamino-diphenyl)-p-diisopropyl benzene,
α,α'-(4,4'-di-N-methylamino-diphenyl)-p-diisopropyl benzene,
α,α'-(4,4'-diamino-diphenyl)-p-diisobutyl benzene, and
α,α'-(4,4'-diamino-diphenyl)-m-diisopropyl benzene.

The aforementioned binuclear diamino-diphenyl alkanes can be obtained, for example (according to German patent specifications Nos. 1,220,863 and 1,268,152), by reacting acetone or formaldehyde with aniline or N-substituted anilines in the presence of catalysts, whilst the aforementioned trinuclear diamino compounds can be obtained by reacting the corresponding diisoalkenyl benzenes with aniline or N-substituted anilines in the presence of catalysts.

The process according to the invention may be carried out in different ways. One particularly smooth embodiment starts with a dihalide, preferably the dichloride, of the aromatic dicarboxylic acid, which is reacted at a temperature of from about −20 to about +60° C., and preferably at a temperature of from about 0 to about 20° C., with an equivalent quantity of equal or different amounts of one of the aforementioned dihydroxy compounds and one of the aforementioned diamines, in an inert solvent, such as benzene, toluene, methylene chloride, carbon tetrachloride, chlorobenzene, chloroform, ethylene chloride, dioxan, tetrahydrofuran, N-methyl pyrrolidone, pyridine and, in particular, cyclohexanone, either in homogeneous solution in the presence of an equivalent quantity of a tertiary amine, for example triethylamine, dimethylaniline, quinoline or pyridine, or in a two-phase reaction medium in the presence of an aqueous alkali metal hydroxide or carbonate solution, following the addition of a small quantity of a tertiary amine, such as triethylamine, dimethylcyclohexylamine, dimethylaniline, quinoline or tributylamine, or of a quaternary base, for example tetramethyl ammonium hydroxide or triethyl benzyl ammonium hydroxide as catalyst.

The sum of the functional groups of diamine and bisphenol should always be equivalent to the acid halide groups in the dicarboxylic acid derivative used. The ratio between ester and amide groups in the polycondensate can be varied within wide limits, for example between about 1:9 and 9:1.

In order to obtain a regular, soluble copolycondensate, it is best initially to introduce into the reaction vessel either the diamine or the dihydroxy compound, in the form of a dilute solution in one of the aforementioned solvents, together with the requisite quantity of the necessary acid-yielding compound, whilst the solutions of dicarboxylic acid dichloride and the third reagent required, namely dihydroxy compound or diamine, are added dropwise from separate vessels. It has proved to be of particular advantage to carry out the polycondensation reaction as an interfacial reaction in a system of dilute sodium hydroxide/cyclohexanone at a temperature of from 0 to 10° C. In this embodiment of the invention, rapid stirring, effective cooling and quick dropwise addition of the reagents are all advisable measures. In this embodiment, particularly high molecular weights are obtained.

The reduced viscosity quoted in the following examples is defined by the equation:

$$\eta_{red} = \eta_{rel} - 1/c$$

The following examples are to further illustrate the invention without limiting it.

EXAMPLE 1

Polyesteramide obtained from bisphenol A, bisaniline A and terephthaloyl chloride by the phase-interface process A solution of 11.4 g. (0.05 mol) of bisphenol A in a 5% weight sodium hydroxide solution containing 8.8 g. (0.22 mol) of NaOH, and 400 ml. of cyclohexanone, are introduced into a 2 liter vessel equipped with a high speed stirrer and two dropping funnels, and the resulting mixture is cooled to 0° C. At this temperature, solutions of 11.3 g. (0.05 mol) of bisaniline A and 20.3 g. (0.1 mol) of terephthaloyl chloride, each in 200 ml. of cyclohexanone, are simultaneously added dropwise over a period of 3 to 5 minutes with vigorous stirring. The reaction temperature is kept below 10° C. Triethylamine is then added as catalyst in a quantity of 0.3 ml. and the solution which has turned viscous is diluted with 500 ml. of cyclohexanone. This is followed by stirring from 10 to 15 minutes, after which the organic phase, following acidification with phosphoric acid, is separated and washed free from electrolyte with water.

The resulting solution of the polyesteramide in cyclohexanone can be concentrated and cast directly into films, or the polycondensate can be precipitated by methanol, dried and cast into films from another solvent, for example dimethyl formamide or N-methyl pyrrolidone.

The polyesteramide is obtained in a yield of 30 g. (85% of the theoretical) with a reduced viscosity (measured in m-cresol) of 1.5.

The second-order transition temperature measured by differential thermoanalysis (DTA) [cf. J. Polym. Sci., C., Polym. Symposia No. 6, Interscience Pub., 1964] is 262° C., whilst the decomposition temperature is above 360° C. In an oscillating twisting test, the maximum of the mechanical loss factor is measured at 290° C. and a constant shear modulus at up to about 250° C.

The polyesteramide is soluble in solvents such as cyclohexanone, dimethyl formamide, dimethyl acetamide, N-methyl pyrrolidone, and hexamethyl phosphoric acid triamide, and can be processed from these solvents to form films, foils, coatings, fibres and filaments.

The following mechanical strengths were measured on 100μ thick films:

| | |
|---|---|
| Breaking strain approximately _____kp./cm.$^2$__ | 600 |
| Elongation at break _____percent__ | 80 |
| E-modulus _____kp./cm.$^2$__ | 23,000 |
| Impact strength _____cmkp./cm.$^2$__ | 235 |

The structure of the polyesteramide is confirmed by the infra-red spectrum (FIG. 1) which shows the carbonyl band of the ester groups at 1735 cm.$^{-1}$ and that of the amide groups at 1650 cm.$^{-1}$. The other bands are also consistent with the assumed structure.

Bisphenol A: 2,2-bis-(4-hydroxyphenyl)-propane.
Bisaniline A: 2,2-bis-(4-aminophenyl)-propane.

EXAMPLE 2

Polyesteramide obtained from bisphenol A, bisaniline A and terephthaloyl chloride by the homogeneous solution process 5.7 g. (0.025 mol) of bisphenol A dissolved in 200 ml. of pyridine are introduced into the reaction vessel, a solution of 5.7 g. (0.025 mol) of bisaniline A in 200 ml. of pyridine, and a solution of 10.2 g. (0.05 mol) of terephthaloyl chloride in 100 ml. of cyclohexanone being simultaneously added dropwise with stirring at a temperature of 20° C. The thickening solution was stirred for another 30 minutes at 20° C. after which the polycondensation product was precipitated by methanol. After drying at 80° C. in vacuo, the polyesteramide was obtained in a yield of 75% with a reduced viscosity of 0.4 (m-cresol). Its properties are the same as those of the product described in Example 1.

EXAMPLE 3

Polyesteramide obtained from 25% of bisphenol A, 75% of bisaniline A and terephthaloyl chloride Following the procedure described in Example 1, 5.7 g. (0.025 mol) of bisphenol A dissolved in a 5% by weight aqueous solution of 8.8 g. (0.22 mol) of sodium hydroxide, are polycondensed into a high molecular weight polyesteramide, with a predominating polyamide component, with the reagents bisaniline A and terephthaloyl chloride which are simultaneously added dropwise in quantities of 17.0 g. (0.075 mol) and 20.3 g. (0.1 mol), respectively, each in solution in cyclohexanone. The product obtained in a yield of 70% has a reduced viscosity of 2.5 and a second order transition temperature of 293° C. as determined by DTA, and is thermally stable at temperature of up to around 400° C. The polyesteramide is soluble in cyclohexanone, dimethyl formamide, dimethyl acetamide, dimethyl sulphoxide, N-methyl pyrrolidone and pyridine, and clear colorless films can be cast from dimethyl formamide solution.

EXAMPLE 4

Polyesteramide obtained from 75% to bisphenol A, 25% of bisaniline A and terephthaloyl chloride Solutions of 5.7 g. (0.025 mol) of bisaniline A and 20.3 g. (0.1 mol) of terephthaloyl chloride, each in 200 ml. of cyclohexanone, are simultaneously added dropwise with vigorous stirring at 0° C. to a solution of 17.8 g. (0.075 mol) of bisphenol A in a 5% by weight aqueous solution of 8.8 g. (0.22 mol) of sodium hydroxide, mixed with 400 ml. of cyclohexanone. The mixture is left to react as in Example 1 after which the polyesteramide, with a predominating polyester component, is isolated. The polyesteramide with a reduced viscosity of 1.3 (measured in m-cresol) is obtained in a yield of 80%. It is highly soluble in N-methyl pyrrolidone from which clear films were cast, and less readily soluble in dimethyl formamide, dimethyl acetamide and cyclohexanone.

EXAMPLE 5

Polyesteramide of bisphenol A, bisaniline A and isophthaloyl chloride

Following the procedure described in Example 1, 11.4 g. (0.05 mol) of bisphenol A dissolved in 400 ml. of cyclohexanone, and a 5% by weight aqueous solution of 8.8 g. (0.22 mol) of sodium hydroxide were reacted simultaneously with 11.3 g. (0.05 mol) of bisaniline A and 20.3 g. (0.1 mol) of isophthaloyl chloride at a temperature of 0° C. The polyesteramide having a reduced viscosity of 0.3 was obtained in a yield of 95%. Films, foils and fibres can be produced from solutions of this polyesteramide in cyclohexanone, dimethyl formamide or N-methyl pyrrolidone.

EXAMPLE 6

Polyesteramide of $\alpha,\alpha'$ - (4,4'-diamino-diphenyl)-p-diisopropyl benzene (trinuclear bisaniline), bisphenol A and terephthaloyl chloride Following the procedure described in Example 1, 11.4 g. (0.05 mol) of bisphenol A were reacted with 17.2 g. (0.05 mol) of trinuclear bisaniline and 20.3 g. (0.1 mol) of terephthaloyl chloride in the presence of 8.8 g. (0.22 mol) of sodium hydroxide in the form of a 5% by weight aqueous solution. Cyclohexanone was again used as the organic phase.

A polyesteramide with a reduced viscosity of 1.2 was obtained in a yield of 80%. Its second order transition temperature was 250° C. as measured by DTA, and its decomposition temperature was 375° C. Clear films were obtained from dimethyl formamide.

The following mechanical properties were measured on 100μ thick films:

| | |
|---|---|
| Breaking strain _____kp./cm.$^2$__ | 860 |
| Elongation at break _____percent__ | 80 |
| Modulus of elasticity _____kp./cm.$^2$__ | 24,700 |
| Impact strength _____cm. kp./cm.$^2$__ | 1200 |

EXAMPLE 7

Polyesteramide of bisphenol A, N,N'-dimethyl bisaniline A and terephthaloyl chloride 11.4 g. (0.05 mol) of bisphenol A are dissolved in a solution of 8.8 g. (0.22 mol) of sodium hydroxide in 170 ml. of water, and the resulting solution is mixed with 400 ml. of methylene chloride. Solutions of 12.7 g. (0.05 mol) of N,N'-dimethyl bisaniline A and 20.3 g. (0.1 mol) of terephthaloyl chloride are simultaneously added dropwise to this mixture with rapid stirring over a period of 5 minutes at a temperature of 0° C. 0.3 ml. of triethylamine is then added as catalyst, followed by stirring for another 15 minutes. The resulting polyesteramide solution is separated off and washed neutral and salt-free with water. The polyesteramide can be isolated from the dried solution by precipitation or by distilling off the solvent.

The N-substituted polyesteramide with a reduced viscosity of 0.4 (measured in methylene chloride), is obtained in a yield of 70%. It is soluble in a number of organic solvents, such as methylene chloride, chlorobenzene, toluene, cyclohexanone, dimethyl formamide, dimethyl sulphoxide, and can be processed both from solution and from the melt to form films, foils, fibres and mouldings.

EXAMPLE 8

Polyesteramide of tetrachloro-bisphenol A, bisaniline A and terephthaloyl chloride 18.3 g. (0.05 mol) of 2,6,2',6'-tetrachloro-bisphenol A are simultaneously condensed while stirring vigorously with 11.3 g. (0.05 mol) of bisaniline A and 20.3 g. (0.1 mol) of terephthaloyl chloride in a two-phase system of cyclohexanone/aqueous sodium hydroxide solution, as described in Example 1. The polyesteramide with a reduced viscosity of 0.5 (measured in m-cresol), which is obtained in a yield of 80%, has a second order transition temperature of 173° C. and a decomposition temperature of 350° C. Transparent films can be cast from N-methyl pyrrolidone.

EXAMPLE 9

Polyesteramide of 2,2-(4,4'-dihydroxy - 3,3' - dimethyl-diphenyl) - propane, bisaniline A and terephthaloyl chloride 12.8 g. (0.05 mol) of 2,2-(4,4'-dihydroxy-3,3'-dimethyl-diphenyl)-propane are polycondensed at 0° C. with 11.3 g. (0.05 mol) of bisaniline A and 20.3 g. (0.11) of terephthaloyl chloride in a mixture of cyclohexanone and 5% by weight aqueous sodium hydroxide solution, by the interfacial polycondensation process described in Example 1. The resulting high molecular weight polyesteramide is obtained in a yield of 80%. It has a reduced viscosity of 2.3, a second order transition temperature of 295° C. and a decomposition temperature of 375° C. Thermally stable films, foils and fibres can be obtained from solutions of the polyesteramide in cyclohexanone, and dimethyl formamide.

EXAMPLE 10

Polyesteramide of bisphenol A, 4,4'-diamino-diphenyl ether and terephthaloyl chloride 11.4 g. (0.05 mol) of bisphenol A are dissolved in a solution of 8.8 g. (0.22 mol) of sodium hydroxide in 170 ml. of water and 400 ml. of cyclohexanone, and the resulting solution is condensed with vigorous stirring at 0° C. simultaneously with 10.0 g. (0.05 mol) of 4,4'-diamino-diphenyl ether and 20.3 g. (0.1 mol) of terephthaloyl chloride to form a high molecular weight polyesteramide by the procedure described in Example 1, and isolated from the reaction mixture.

The polyesteramide obtained in a yield of 80% with a reduced viscosity of 0.3 (measured in m-cresol) has a second order transition temperature of approximately 220° C. and can be processed into films, foils and fibres from a solution in N-methyl pyrrolidone.

EXAMPLE 11

Polyesteramide of 1,1-(4,4'-dihydroxy-diphenyl)-cyclododecane, bisaniline A and terephthaloyl chloride The interfacial polycondensation as described in Example 1 of 17.6 g. (0.05 mol) of 1,1-(4,4'-dihydroxydiphenyl)-cyclododecane in cyclohexanone solution in the presence of a 5% by weight aqueous solution of 8.8 g. (0.22 mol) of sodium hydroxide with 11.3 g. (0.05 mol) of bisaniline A and 20.3 g. (0.1 mol) of terephthaloyl chloride give the corresponding polyesteramide with a reduced viscosity of 1.4 (in m-cresol) in a yield of 85%. The polyesteramide has a second order transition temperature of 273° C. and can be converted into transparent thermally-stable films, foils and fibres from solutions in cyclohexanone or dimethyl formamide.

EXAMPLE 12

Polyesteramide of 4,4'-dihydroxy-3,3'-dimethyl-diphenyl disulphide, bisaniline A and terephthaloyl chloride 12.3 g. (0.05 mol) of 4,4'-dihydroxy-3,3'-dimethyldiphenyl sulphide are polycondensed with 11.3 g. (0.05 mol) of bisaniline A and 20.3 g. (0.1 mol) of terephthaloyl chloride by the procedure described in Example 1 in a two-phase system of cyclohexanone and aqueous 5% by weight sodium hydroxide solution, and the product is isolated. The resulting polyesteramide obtained in a yield of 90% has a reduced viscosity of 1.3 (m-cresol) and a second order transition temperature of 230° C. as measured by DTA. It can be converted into films, foils and fibres from solutions in dimethyl formamide, N-methyl pyrrolidone and cyclohexanone.

EXAMPLE 13

Polyesteramide of 4,4'-dihydroxy-3,3'-dimethyl-diphenyl sulphone bisaniline A and terephthaloyl chloride 13.9 g. (0.05 mol) of 4,4'-dihydroxy-3,3'-dimethyldiphenyl sulphone are polycondensed with 11.3 g. (0.05 mol) of bisaniline A and 20.3 g. of terephthaloyl chloride in the presence of 8.8 g. (0.22 mol) of sodium hydroxide in a 5% by weight aqueous solution as base, as described in the preceding examples.

The corresponding polyesteramide, with a reduced viscosity of 0.6 (m-cresol), is obtained in a yield of 86%. Its second order transition temperature is 245° C. Films, foils and fibres can be obtained from solutions of the polyesteramide in dimethyl formamide, cyclohexanone or dimethyl acetamide.

EXAMPLE 14

Polyesteramide of 4,4' - dihydroxy-3,5,3',5'-tetramethyl-diphenylmethane, 4,4'-diamino-diphenyl-methane and terephthaloyl chloride The interfacial polycondensation of 12.8 g. (0.05 mol) of 4,4' - dihydroxy-3,5,3',5'-tetramethyl-diphenylmethane in cyclohexanone/aqueous sodium hydroxide solution (8.8 g. of sodium hydroxide) with 9.9 g. (0.05 mol) of 4,4'-diamino-diphenyl-methane and 20.3 g. (0.1 mol) of terephthaloyl chloride at a temperature of 0° C. gives the corresponding polyesteramide with a reduced viscosity of 0.75 (measured in N-methyl pyrrolidone) and a second order transition temperature of 239° C. in a yield of more than 90%.

What we claim is:

1. A high molecular weight polyesteramide consisting of from 10 to 90 mol percent of recurring structural units of the formula

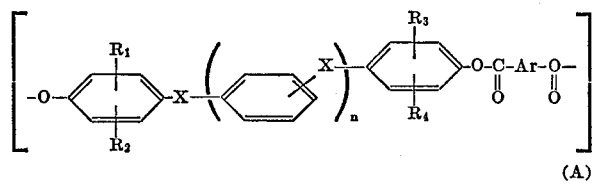

(A)

and of from 90 to 10 mol percent of recurring structural units of the formula

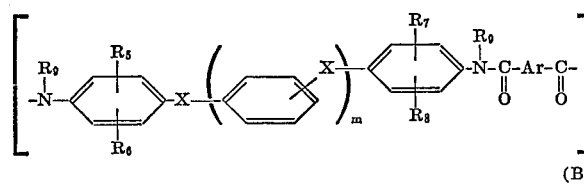

(B)

in which $R_1$ to $R_8$, which may be the same or different, each represents hydrogen, a $C_1$ to $C_3$ alkyl, chlorine or bromine, $R_9$ represents hydrogen, a $C_1$ to $C_4$ alkyl radical or a $C_6$ to $C_{12}$ aryl, Ar represents a p- or m-phenylene, diphenylene, diphenylalkylene, diphenyl ether, diphenyl sulphide or diphenyl sulphone, X represents a direct bond or a bivalent radical selected from the group consisting of a $C_1$ to $C_5$ alkylene, a $C_1$ to $C_5$ isoalkylene, a $C_5$ to $C_{12}$ cycloalkylene, oxygen and sulphur, and n and m, which may be the same or different, each represents 0 or 1, the total number of units the Formula A and B being greater than 10, and the polyesteramide having a reduced viscosity $$\eta_{red} = \eta_{rel-1}/c$$

in excess of 0.3.

2. High molecular weight polyesteramides as claimed in claim 1, wherein the total number of units of the Formulae A and B is greater than 40.

3. A high molecular weight polyesteramide consisting essentially of from 10 to 90 mol percent of recurring structural units of formula $$\left[-O-\underset{R_2}{\underset{|}{\overset{R_1}{\overset{|}{\bigcirc}}}}-X-\left(\bigcirc\right)_n-X-\underset{R_4}{\underset{|}{\overset{R_3}{\overset{|}{\bigcirc}}}}-O-\overset{O}{\overset{\|}{C}}-Ar-\overset{O}{\overset{\|}{C}}-\right]$$ (A)

and of from 90 to 10 mol percent of recurring structural units (B) selected from the group consisting of (B₁), (B₂), (B₃), (B₄), (B₅)

in which $R_1$ to $R_4$, which may be the same or different, each represents hydrogen, a $C_1$ to $C_3$ alkyl, chlorine or bromine;

Ar represents a p- or m-phenylene, diphenylene, diphenylalkylene, diphenylether, diphenylsulfide or diphenylsulfone radical;

X represents a direct bond or a bivalent radical selected from the group consisting of a $C_1$ to $C_5$ alkylene, a $C_1$ to $C_5$ isoalkylene, a $C_5$ to $C_{12}$ cycloalkylene, oxygen and sulfur; and n represents 0 or 1;

the total number of units of the Formulae A and B being greater than 10, and the polyesteramide having a reduced viscosity $$\eta_{red} = \eta_{rel-1}/c$$

in excess of 0.3.

4. The polyesteramide of claim 3 wherein said recurring structural unit (B) is (B₁).
5. The polyesteramide of claim 3 wherein said recurring structural unit (B) is (B₂).
6. The polyesteramide of claim 3 wherein said recurring structural unit (B) is (B₃).
7. The polyesteramide of claim 3 wherein said recurring structural unit (B) is (B₄).
8. The polyesteramide of claim 3 wherein said recurring structural unit (B) is (B₅).

References Cited

UNITED STATES PATENTS

| | | | |
|---|---|---|---|
| 3,154,524 | 10/1964 | Martinek | 260—78 |
| 3,272,774 | 9/1966 | Moyer | 260—47 |
| 3,272,776 | 9/1966 | Caldwell | 260—47 |
| 3,313,777 | 4/1967 | Elam et al. | 260—47 |
| 3,415,780 | 12/1968 | Holub | 260—47 |
| 3,354,127 | 11/1967 | Hill et al. | 260—78 |

FOREIGN PATENTS

| | | | |
|---|---|---|---|
| 1,027,892 | 4/1966 | Great Britain | 260—47 CZ |

LESTER L. LEE, Primary Examiner

U.S. Cl. X.R.

260—30.2, 30.4 N, 30.6 R, 32.6 N, 32.8 N, 33.8 R